Patented Nov. 9, 1937

2,098,365

UNITED STATES PATENT OFFICE 2,098,365

POROUS HALOGEN CONTAINING RUBBER DERIVATIVES

Herbert A. Winkelmann, Chicago, and William C. Calvert, Oak Park, Ill., assignors to Marbon Corporation, a corporation of Delaware No Drawing. Application September 5, 1935, Serial No. 39,220

4 Claims. (Cl. 18—53)

This invention relates to porous or cellular articles composed mainly of rubber derivatives, particularly of halogen containing rubber derivatives such as rubber hydrochloride.

It is an object of this invention to make a porous or cellular mass which will not be affected by oil.

One object is to make a sponge which will quickly adsorb and retain large amounts of liquids including oils.

Another object is to make a filter plate particularly adapted for filtering oil.

A further object is to make an oil reservoir.

Another object is to produce soft, resilient, porous articles suitable for ear pieces in telephone head sets, arm rests, cushions and the like.

Other objects will become apparent on reading the specification.

In the present invention a halogen containing rubber derivative, preferably rubber hydrochloride, is milled with an expanding agent such as sodium bicarbonate, a vulcanizing agent such as sulfur, and an accelerator of vulcanization. Various softeners such as resins, stearic acid, and the like may be incorporated. The milled composition is then molded at about 288° F. for sixty minutes, or at any temperature and time interval sufficient to effect a cure or vulcanization and at the same time decompose the expanding agent so that a porous vulcanized halogen containing rubber derivative is obtained. In order that the halogen containing rubber derivative remain in its substantially undecomposed state it is advisable that a stabilizing material such as magnesium oxide should be admixed during the milling. Other stabilizers such as magnesium carbonate, calcium oxide, sodium carbonate, disodium phosphate, sodium polysulphide and lead oxide may be used. Where the stabilizer is decomposed during the molding the stabilizer acts also as an expanding agent. However, any stabilizer, including organic stabilizers such as hexamethylene tetramine may be used. The copending application of Herbert A. Winkelmann, Serial Number 11,665, filed March 18, 1935, describes and claims the use of heat stabilizers with halogen containing rubber derivatives.

The following formula gives satisfactory porous rubber hydrochloride:

| | |
|---|---|
| Rubber hydrochloride | 100 |
| Magnesium oxide | 10 |
| Lead oxide | 10 |
| Glycerine phthalic anhydride resin | 5 |
| Cumar resin | 5 |
| Stearic acid | 6 |
| Sulfur | 7 |
| Butyraldehyde-aniline | 5 |
| Sodium bicarbonate | 10 |

In place of sodium bicarbonate other blowing agents may be used such as sodium carbonate, ammonium carbonate, a mixture of ammonium chloride and sodium nitrite. Wool fiber may also be used as a blowing agent since it decomposes during the heat treatment.

Softer sponges may be made by increasing the amount of softeners. Various resins may be added. Cumar, toluene ethyl sulfoamides are good softeners and fillers. Non resinous fillers such as brown substitute, wood flour, cotton flock may also be used. None of these softeners and fillers, however, are essential.

Stearic acid has a softening action and supplies acid, but in the case of halogen containing rubber derivatives is not of great value and may be eliminated from the formula.

The stabilizers may be varied in amount and even may be eliminated entirely with, however, the production of less satisfactory sponges due to decomposition. Magnesium oxide alone or with lead oxide is a preferred stabilizer. Sodium polysulfide is also a good stabilizer and in addition acts to some extent as a vulcanizer.

The use of sulfur and an accelerator is also not absolutely essential in making a porous rubber hydrochloride, but should be used where soft, strong, flexible, comparatively non-thermoplastic sponges are desired. When vulcanizing agents are not used the products are thermoplastic, strong, hard, tough and to only slight extent flexible, but may be varied in characteristics by the incorporation of softeners and fillers. The vulcanized product, on the other hand, is comparatively non-thermoplastic, can be removed hot from a mold, and is strong, soft, resilient and flexible. However, the characteristics of this product may be varied by the incorporation of fillers and by varying the time and temperature of cure. Short cures of ten minutes are feasible. Lower temperatures or slightly higher temperatures than 288° F., as for example 307° F., may be used for molding, curing and blowing.

Various accelerators may be used. Butyraldehyde aniline is a satisfactory accelerator, but other rubber accelerators such as heptaldehyde-aniline, a 60-40 mixture of diphenyl guanidine and 2-4 dinitro phenyl thio benzo thiozole and others described in the copending application of Herbet A. Winkelmann, Serial No. 23,431, filed May 20, 1933, may be used. Accelerators which will decompose such as dinitrophenyl dimethyl dithiocarbamate can be used, which will also act as a blowing agent in addition to its action as an accelerator.

The amount of blowing or expanding agent may be varied, thus varying the porosity of the product. The porosity is similar to that of rubber sponges. The specific gravity may vary from about 0.4 to 1. or, in other words, similarly to that of porous or cellular rubber.

The hardness and flexibility may be varied similarly to that of rubber sponges by varying the proportion of softeners and the amount of vulcanization. The strength of the rubber hydrochloride sponges of this invention is also similar to rubber so that the products are capable of withstanding hard and long usage.

The great advantage of rubber hydrochloride sponges over rubber sponges is their superior oil resistance. Consequently the rubber hydrochloride sponges find many uses which are not practical for rubber. Oil sponges, oil reservoirs and oil filter plates are important adaptions of the new product. The halogen containing rubber sponges, although having similar ability to adsorb water as rubber sponges, are not so water absorbent. They are exceptionally resistant to water, soaps, acids and alkalis.

Where adsorption or filtering ability is not important the surface skin present on removal of the product from the mold may be allowed to remain. These cellular products having a surface skin are particularly useful for cushions, arm rests, and the like. The removal of the skin, however, is readily accomplished as, for example, by slicing the material or rupturing the skin in any way.

It is to be understood that numerous details of the invention may be varied without departing from its principles. Rubber halides, and halogenated rubber hydrohalides may be made into porous form by applying the principles of this invention. Rubber halides, however, give less satisfactory results in general than rubber hydrohalides, due to the instability of the rubber halides, and the difficulty in vulcanizing or curing such compounds.

Of the rubber hydrohalides the most satisfactory from the point of view of giving porous, oil resistant products, is the rubber hydrochloride made by reacting solid rubber with gaseous hydrogen chloride at elevated temperatures. With this type of rubber hydrochloride porous products can be made which are not only more resistant to oil and gasoline than rubber, but are practically unaffected by benzol and other common rubber solvents. In the specification and claims this type of rubber hydrochloride is referred to as the insoluble type reaction product of solid rubber and gaseous hydrogen chloride.

We claim:

1. As a new article of manufacture, a solid, porous, flexible mass comprising a vulcanized halogen containing rubber derivative and having uniformly distributed pores of such size and amount as those present in rubber sponges.

2. As a new article of manufacture, a solid, porous, flexible mass comprising a vulcanized rubber hydrochloride, and having uniformly distributed pores of such size and amount as those present in rubber sponges.

3. The method of making a porous, oil resistant, flexible mass which comprises heat treating a mixture of a halogen containing rubber derivative, a vulcanizing agent, and an expanding agent at a temperature and for a time sufficient to cure the halogen containing rubber derivative and decompose the blowing agent whereby a porous mass is produced.

4. The method of making a porous, oil resistant, flexible mass which comprises heat treating a mixture of a rubber hydrochloride, a vulcanizing agent, and a blowing agent at a temperature and for a time sufficient to cure the halogen containing rubber derivative and decompose the expanding agent whereby a porous mass is produced.

HERBERT A. WINKELMANN.
WILLIAM C. CALVERT.